May 7, 1957 C. W. BERTHIEZ 2,791,144
TURNING DEVICE
Filed Oct. 18, 1949 6 Sheets-Sheet 3

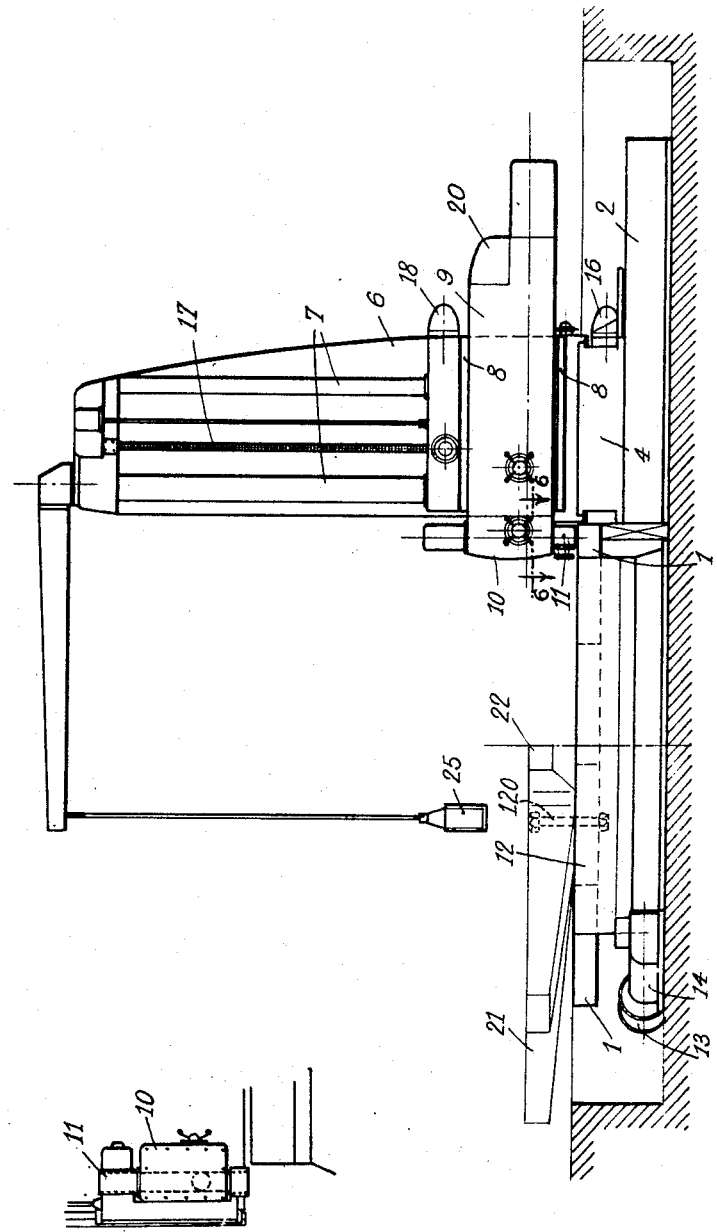

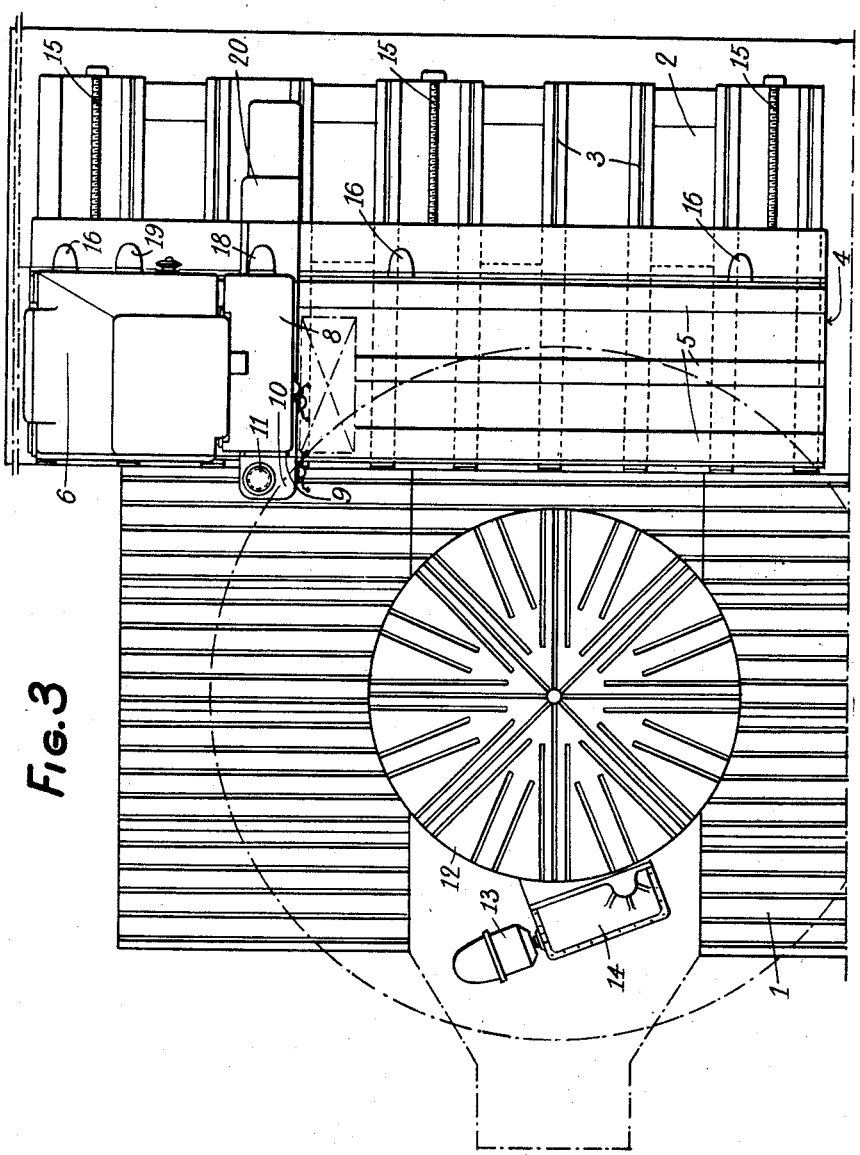

INVENTOR
Charles William Berthiez
By George H. Carey
ATTORNEY

May 7, 1957

C. W. BERTHIEZ 2,791,144

TURNING DEVICE

Filed Oct. 18, 1949

INVENTOR
CHARLES WILLIAM BERTHIEZ

BY George W. Corey

ATTORNEY

May 7, 1957     C. W. BERTHIEZ     2,791,144
TURNING DEVICE

Filed Oct. 18, 1949     6 Sheets-Sheet 6

INVENTOR
CHARLES WILLIAM BERTHIEZ
BY
ATTORNEY

United States Patent Office 2,791,144
Patented May 7, 1957

2,791,144

TURNING DEVICE

Charles William Berthiez, Paris, France

Application October 18, 1949, Serial No. 121,941

Claims priority, application France December 14, 1948

1 Claim. (Cl. 82—2)

In the manufacture of modern engineering structures such as hydraulic turbines, steam turbines, cylinder blocks, diesel engine cradles, ship building parts, alternators etc., it is frequently desirable, in order to reduce machining time to a minimum and to obtain greater accuracy, to minimize handling of these parts and to execute all the machining operations at one setting of the work-piece. This is particularly important in the case of extremely heavy parts composed of several elements which it is difficult to adjust and clamp on the machine tool because there is a chance of distortion occurring in the course of each new setting.

When using conventional horizontal boring and milling machines it is at present possible to perform various machining operations such as boring, drilling, counterboring, tapping, milling, etc. without moving the workpiece from one machine to another.

However, when the operations include vertical turning and boring mill operations, it is necessary to move the workpiece from the horizontal boring and milling machine to a vertical turning and boring mill, and a new setting is required on this machine.

The present invention is designed to obviate resetting of the workpiece by providing a universal machine tool which makes it possible to carry out horizontal boring and milling operations as well as operations hitherto performed on a vertical turning and boring mill only.

To this purpose, and according to the invention, the universal machine tool comprises essentially, in combination, a bed provided with slideways on which an upright is adapted for sliding movement, a boring and milling headstock fitted for vertical sliding displacement on this upright, a bedplate, a rotary table supported by said bedplate and adapted to receive the workpiece and to be driven in rotation, a turning head which may be secured on a member carried by the upright and adapted to hold fixed tools thereon, and means whereby the headstock may be displaced at will in a horizontal direction forming an angle, preferable of 90°, with the direction of the bed slideways in order to increase or reduce the distance between the tools carried by said headstock and the center of the rotary table.

Other characteristics of the invention will become apparent from the following description with reference to the accompanying drawings showing diagrammatically and solely by way of example some embodiments of the invention.

In the drawings:

Fig. 1 is an elevational view of a universal machine tool embodying the invention;

Fig. 2 is a partial side view of the machine shown in Fig. 1;

Fig. 3 is a plan view corresponding to Fig. 1;

Figure 4:
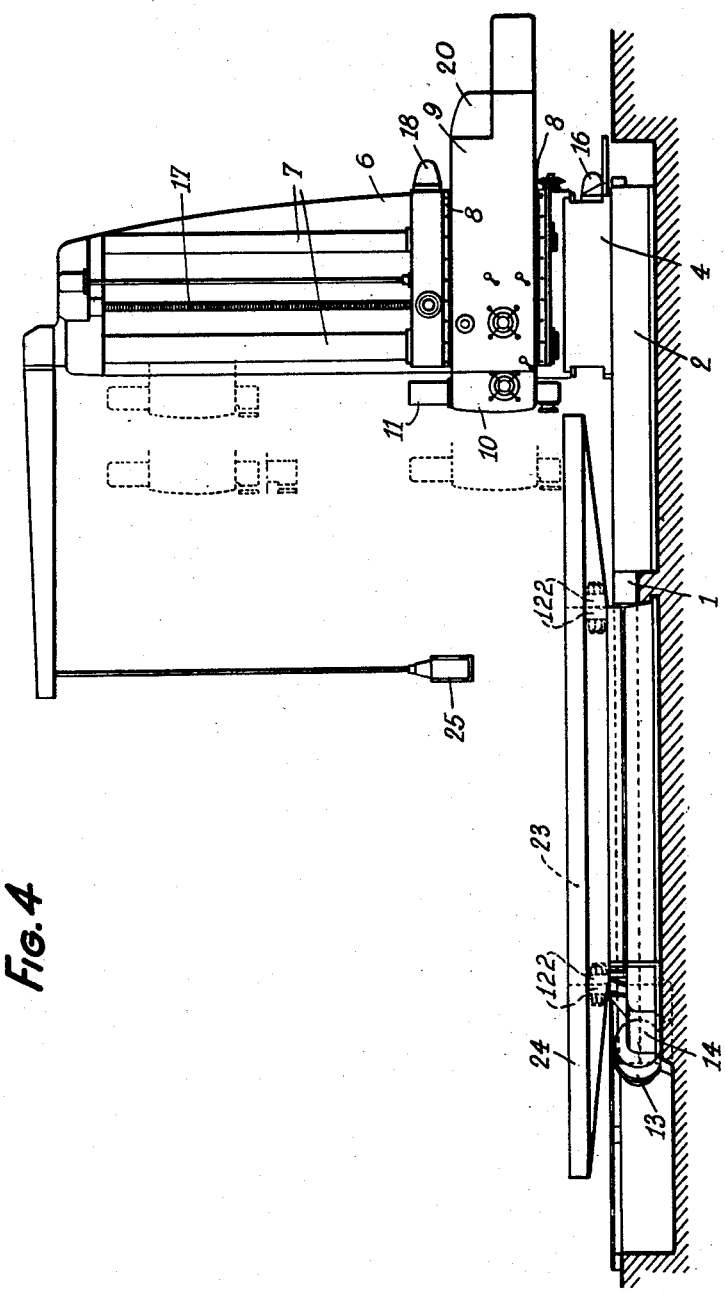
Fig. 4 is an elevational view of a modified embodiment of the machine shown in Figs. 1–3.

In the embodiment of the universal machine according to the invention as shown diagrammatically in Figs. 1–3 a workpiece carrying bedplate 1 is provided with a portion 2 which has parallel slideways 3 on which a bed 4 is adapted to slide. This bed extends in a direction substantially at right angles with the slideways 3. The bed 4 is also provided with longitudinal slideways 5 on which an upright 6 is adapted to move, the upright 6 having in turn vertical slideways 7 for permitting the sliding displacement of a slide or carriage 8 carrying a boring and milling headstock 9.

In the drawings, it is assumed that this headstock 9 is mounted in manner described in the applicant's United States application Serial No. 750,772, filed May 27, 1947, now Patent 2,639,644, May 26, 1953, for "Improvements in Machine Tools such as Boring and Milling Machines," i. e. the headstock proper 9 is so mounted as to allow it sliding movements parallel with the axial direction of the spindle which is commonly carried by this headstock on slideways provided for this purpose in the slide 8.

On the end face of the headstock 9 at the left in Fig. 1 a head 10 is secured by such means as are described in the above mentioned application Serial No. 750,772.

In this head 10 is mounted a slide 11 adapted to move vertically relative to the head 10 and to receive in its lower portion one or several cutting tools for performing vertical turning operations.

The central portion of the workpiece carrying bedplate 1 is hollow so that it may receive a rotary plate or table 12 so mounted that it may rotate about a vertical axis. This rotary plate is driven by means of a device including an electric motor 13 coupled to a speed reducing gear 14 and shown diagrammatically in the drawing.

The various members described above are controlled as follows: the bed 4 is displaced along the slideways 3 of the bedplate by means of three screw devices 15 driven by three synchronized electric motors 16.

The upward and downward movements of the headstock carrying slide or carriage 8 along the upright are effected by means of a worm device or screw threaded shaft 17 driven by a motor 18.

The upright 6 may be moved along its bed 4 by means of another screw device (not shown) driven by a motor 19.

The horizontal displacement of the headstock 9 on its slide 8 is also ensured through the medium of a similar device driven by a motor positioned under a casing 20. This drive may be arranged as disclosed in Patent No. 2,674,925, issued April 13, 1954, in which a screw fixedly supported on slide 8 is engaged by a threaded nut carried by the headstock 9, this nut being driven upon operation of clutching means from a countershaft which is driven from the motor within the casing 20.

Finally, the upward and downward movements of the tool holding slide 11 within the special turning head 10 are effected by means which may be actuated by the motor and clutch means within the casing 20 adapted, as disclosed in the Patent No. 2,674,925, to produce alternatively the feeding movement of the spindle or of the headstock on its slide, or may be effected from the rotary drive of the machine spindle through any suitable connecting or clutching means which are automatically connected when fitting the special turning head 10 on the end face of the headstock 9.

Figure 6:
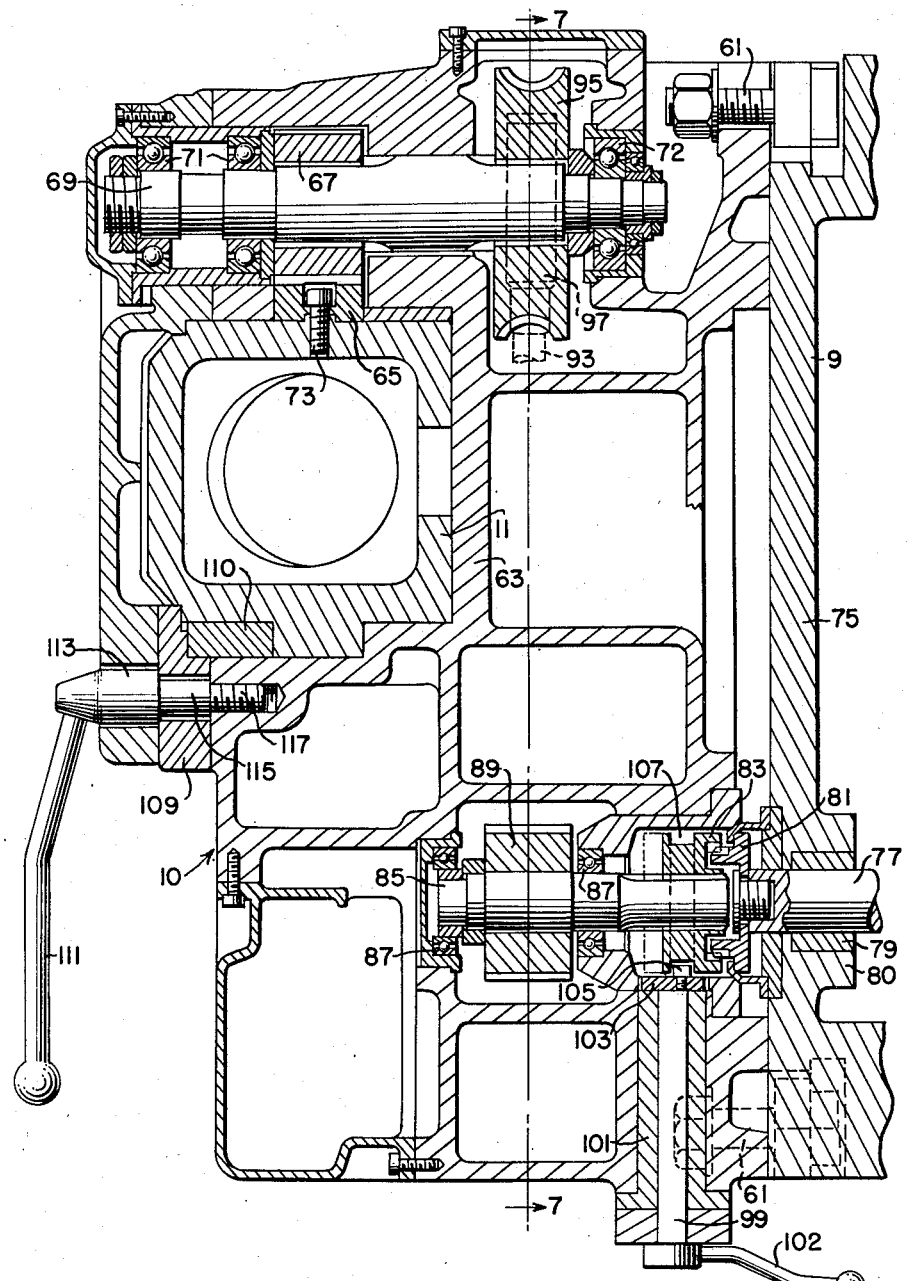
Fig. 6 is a horizontal section on line 6—6 of Fig. 1.

Fig. 6 shows a horizontal section on line 6—6 of Fig. 1 of the turning head 10 secured to the end face of the headstock 9 by suitable bolts 61 which are disposed in slots provided in the head 10 and in the headstock 9. The slide 11 of generally rectangular section is disposed for sliding movement in engagement with surfaces of the body portion 63 that are disposed in rectangular relation to each other. At one face of the slide 11 a rack 65 is secured by screw 73, this rack having teeth in engagement with a pinion 67 keyed to shaft 69 supported in bearings 71, 72 suitably mounted in the body 63 of the head 10. Upon rotation of the shaft 69 in one direction and the other upward and downward movement of the rack and of the slide 11 is effected. As above indicated, a tool supported on the lower end of the slide 11 thus may be moved vertically parallel to the axis of rotation of the table 12. Since the head 10 is securely held upon the end face of the headstock 9, this head and, therefore, the tool are moved horizontally toward and away from the table 12 upon effecting horizontal movement of the headstock 9 in the manner above referred to.

Since the head 10 is secured to the headstock the drive for effecting rotation of the shaft 69 may be provided by extending through the end wall 75 of the headstock shaft 77 which may be the countershaft disclosed in the Patent No. 2,674,925 which, by operation of the clutch means, selectively is connectible to drive the headstock horizontally or to drive the spindle axially parallel to the movement of the headstock. For support of the end of such countershaft so extended, a bearing 79 is mounted in a boss 80 formed on the wall 75 of the headstock.

Carried on the end of the extended shaft 77 is one member of a clutch 81 which is engageable with a second member 83 of the clutch which is slidable on and in splined relation to a shaft 85 supported by bearings 87 mounted in the body 63. The shaft 85 is in alignment with the shaft 77 when the head 10 is mounted in the proper position and secured to the headstock by the bolts 61. The clutch member 83 then may be operated to engage the clutch member 81 to effect rotation of the shaft 85 upon rotation of the shaft 77.

Figure 7:
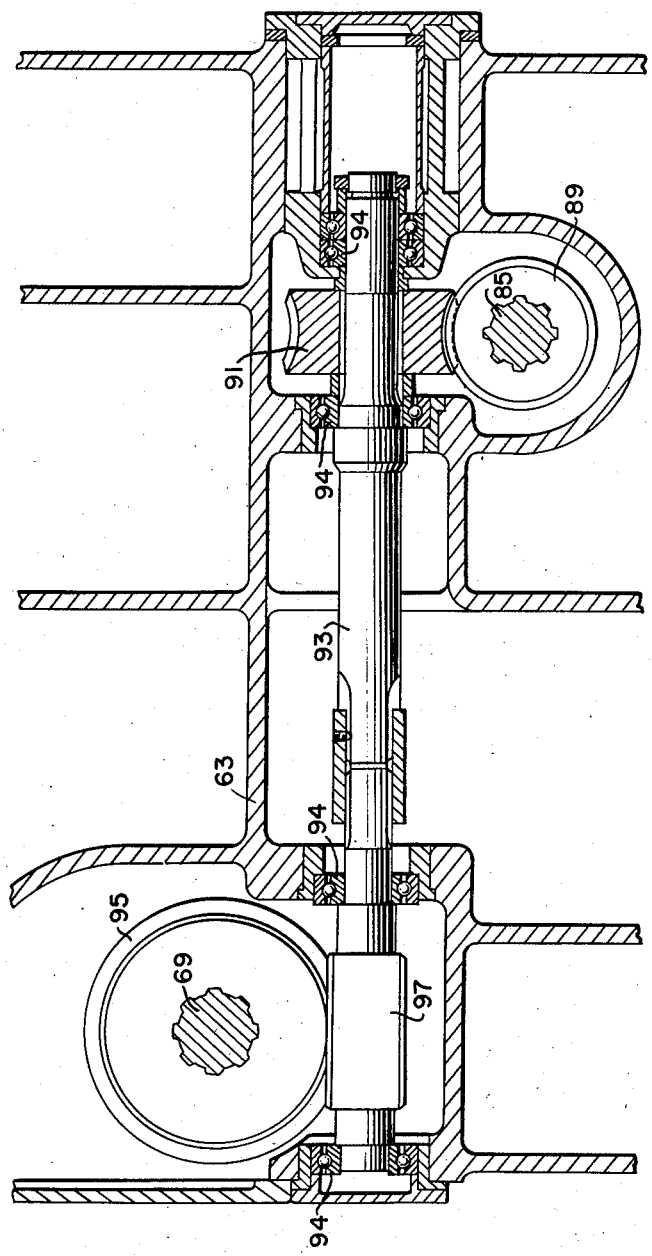
Fig. 7 is a section on line 7—7 of Fig. 6.

Secured to the shaft 85 is a helical gear 89 which meshes with the helical gear 91, Fig. 7, secured upon a shaft 93 supported in bearings 94 mounted in the body 63. The shaft 93 extends horizontally toward the shaft 69 on which is secured a worm gear 95 which meshes with a worm 97 carried by the shaft 93 for effecting rotation of the worm gear 95 and of the shaft 69 upon rotation of the shaft 93 driven by shaft 85. Means thus are provided for effecting rotation of the pinion 67 and the upward and downward movement of the rack 65 and of the slide 11 according as the shaft 77 by suitable operation of the motor and the drive within the headstock casing 20 is rotated in one direction or the other.

In order to effect clutching and declutching operation of the clutch 81, 83 to secure the upward and downward movement of the slide 11 or to stop such movement depending upon the desired conditions of horizontal movement of the headstock or of horizontal movement of the spindle as described in Patent No. 2,674,925, a small shaft 99, Fig. 6, is supported in a bearing 101 mounted in the body 63 of the head 10, this shaft being provided at its outer end with a handle 102 for effecting rotation of the shaft 99 and at its other end with a disc 103 secured by shaft 99 in which is mounted a pin 105 in eccentric relation to the axis of the shaft 99. This pin 105 engages the annular groove 107 formed in the clutch member 83. It will be understood that upon movement of the handle 102 from the position shown in Fig. 6, for example, through 180° toward the left, the pin 105 may be moved toward the left to the opposite side of the axis of the shaft 99, thereby to move the clutch member 83 to the dotted position shown at the left and to effect disengagement of the clutch member 83 from the clutch member 81. Opposite movement of the handle 102 effects clutching engagement of the clutch members 81, 83.

When the clutch members 81, 83 are disengaged, the slide 11 may be clamped in suitable position in the body 63 by operation of a clamp member 109 engaging a block 110 bearing on the slide 11, the clamp 109 being forced into engagement with the block 110 by operation of a handle 111 having its hub portion 113 in bearing engagement upon the clamp 109, the shank 115 connected to the hub 113 being threaded at 117 into the body 63.

The workpiece is secured on the rotatable plate 12 for rotation therewith or if it is to be held stationary the workpiece may be secured also on the bedplate 1 since the upper surfaces are in the same plane. When the special turning head 10 is not fitted on the headstock 9 all the usual boring and milling operations performed by tools carried by the spindle of the boring and milling machine of this type then may be caried out.

However, when one wants to accomplish, on the same workpiece, the kind of machining operations normally executed on a vertical turning mill, care will be taken that the workpiece is secured only on the rotary plate 12 through the intermediary of a distance plate or suitable wedges in the case of a workpiece the dimensions of which extend beyond those of the rotary plate, in order that the workpiece may rotate without any frictional engagement with the bedplate 1. Then the special turning head 10 is secured on the end surface of the headstock 9 that is transverse to the spindle axis and transverse to the horizontal movement of the headstock 9 in the slide or carriage 8, as indicated above, and the necessary cutting tools are fitted to the slide 11 in the head 10. When this mounting is accomplished the boring machine is transformed into a vertical turning mill. The tool may be moved toward or away from the center of the plate 12, either by displacing the headstock 9 horizontally along its slide 8, as above stated, or by displacing the bed 4 along its slideways 3. Also, the movements of this bed may be combined with the displacement of the upright 6 along its bed 4.

Of course, the turning operations may be performed either before or after the boring and milling operations.

When the workpieces are annular shaped and of a size greater than the plate 12, it is advisable to employ the device shown in the left portion of Fig. 1. This device consists of a spider 21 the hub portion 22 of which is secured by bolts 120 on the plate 12. The arms of this spider 21 are longer than the radius of the plate and their upper surfaces are machined to provide a plane horizontal surface whereon the workpiece may be mounted. It will be apparent that when the spider 21 is to be mounted on the plate 12, the bed 4 would be shifted to the right, Figs. 1 and 3, by a distance sufficient for permitting the fitting of the spider.

Figure 5:
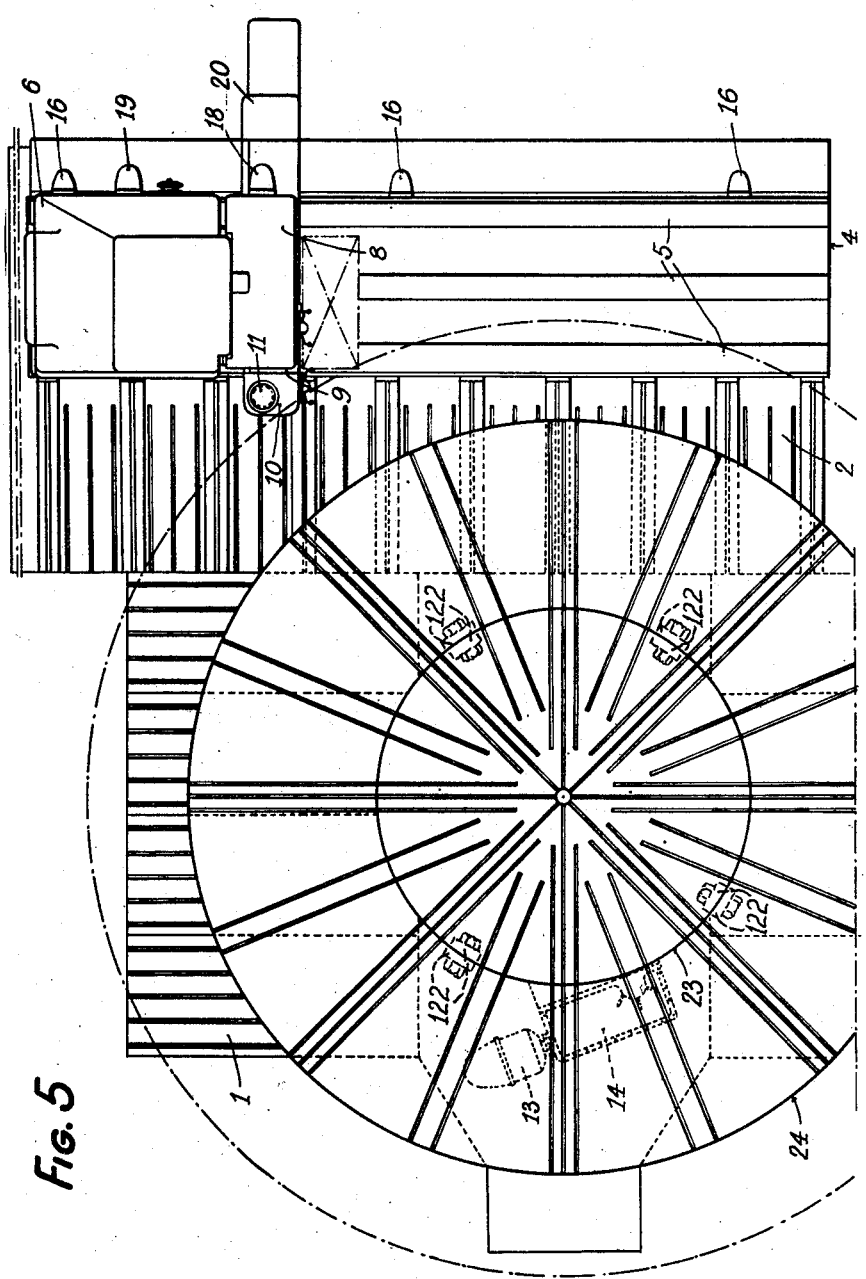
Fig. 5 is a plan view corresponding to Fig. 4.

According to a modified embodiment, a machine of similar construction but having two concentric plates is shown in Figs. 4 and 5, i. e. a circular central plate 23 and an annular peripheral plate 24. The annular plate 24 may be integral or fast with the central plate 23 (or secured thereto by bolts through lugs 122) and driven thereby. This outer annular plate 24 on the other hand may be designed with an independent drive so that when a large annular shaped workpiece is to be machined on this plate 24 the operator may, for instance, stand on the central plate 23 which would be held stationary. The operator is thus able to tend and control the machining of the part by means of the pendant control set 25 suspended above the central plate 23.

The operation of this second embodiment of a universal machine tool according to the invention is substantially the same as that of the first embodiment described with reference to Figs. 1–3 and its various parts are controlled in a similar way.

Although the machine shown in Figs. 4 and 5 has the upper surfaces of the rotary plates 23 and 24 in a plane above that of the bed plate 1, it would not be outside the scope of the invention to design a machine having the surfaces of the rotary plates 23, 24 and of the bed plate 1 positioned in the same plane, as in the embodiment shown in Figs. 1–3.

What I claim is:

A turning device comprising a work holder rotatable on an axis, a rectilinear slideway extending parallel to said axis, a member supported on said slideway and movable relative to said slideway in the direction transversely of said slideway, a head fixedly mounted against rotation on the end of said member that is disposed along said direction toward said axis in offset relation to said slideway, said head providing a second slideway extending transversely to said movement of said member, a slide mounted in said head for movement of said slide on said second slideway, means carried by said head and operatively connected to said slide for moving said slide along said second slideway, and a holder carried by said slide for holding a turning tool for turning operations on a workpiece supported on said rotatable work holder.

References Cited in the file of this patent

UNITED STATES PATENTS

| Number | Name | Date |
|---|---|---|
| 521,353 | Wood | June 12, 1894 |
| 1,517,431 | Jones | Dec. 2, 1924 |
| 1,579,651 | Deale | Apr. 6, 1926 |
| 1,969,791 | Gallimore et al. | Aug. 14, 1934 |
| 2,069,296 | Woytych | Feb. 2, 1937 |
| 2,123,649 | Cotta | July 12, 1938 |
| 2,269,641 | Woytych | Jan. 13, 1942 |
| 2,301,171 | Morton et al. | Nov. 3, 1942 |
| 2,307,222 | Johnson | Jan. 5, 1943 |
| 2,313,624 | Clayton | Mar. 9, 1943 |
| 2,324,180 | Trosch | July 13, 1943 |
| 2,339,435 | Stephan | Jan. 18, 1944 |
| 2,354,413 | Walter | July 25, 1944 |
| 2,354,414 | Walter | July 25, 1944 |
| 2,365,068 | Gerbig | Dec. 12, 1944 |
| 2,393,696 | Kraut | Jan 29, 1946 |
| 2,465,497 | Turrettini | Mar. 29, 1949 |
| 2,536,937 | Hosea | Jan. 2, 1951 |

FOREIGN PATENTS

| Number | Country | Date |
|---|---|---|
| 143,187 | France | June 2, 1881 |
| 600,521 | Germany | July 25, 1934 |